United States Patent
Du et al.

(10) Patent No.: US 6,529,511 B1
(45) Date of Patent: Mar. 4, 2003

(54) LOCAL AREA NETWORK WITH A HEADER CONVERTER

(75) Inventors: Yonggang Du, Aachen (DE); Andries Van Wageningen, Wijlre (NL); Rolf Kraemer, Herzogenrath (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/061,793

(22) Filed: Apr. 16, 1998

(30) Foreign Application Priority Data

Apr. 16, 1997 (DE) .......................................... 197 15 799

(51) Int. Cl.⁷ ............................................. H04L 12/56
(52) U.S. Cl. .................................... 370/397; 370/395.1
(58) Field of Search ................................ 370/389, 401, 370/395, 399, 397, 465, 351, 352, 216, 218, 222, 223, 224, 225, 228, 403, 404, 405, 535, 537, 390, 392, 394, 396, 398, 395.1, 455, 461, 462, 463; 714/57

(56) References Cited

U.S. PATENT DOCUMENTS

| | | | |
|---|---|---|---|
| 5,345,558 A | 9/1994 | Opher et al. | 395/200 |
| 5,408,469 A | 4/1995 | Opher et al. | 370/60 |
| 5,600,795 A | 2/1997 | Du | 395/200 |
| 5,610,918 A * | 3/1997 | Kamo et al. | 370/470 |
| 5,872,786 A * | 2/1999 | Shobatake | 370/398 |
| 6,122,759 A * | 9/2000 | Ayanoglu et al. | 714/57 |

FOREIGN PATENT DOCUMENTS

EP 0614296 A2 9/1994

OTHER PUBLICATIONS

"Telekommunikation Aktuell, ATM Anwendungen, Multi-mediakommunikation Uber Datenautobahnen", VDE VERLAG GmbH 1995, pp. 11–16.

* cited by examiner

Primary Examiner—Dang Ton
(74) Attorney, Agent, or Firm—Laurie E. Gathman

(57) ABSTRACT

A local area ring network operating in the asynchronous transfer mode (ATM) has a plurality of stations and network interfaces (transceivers), each network interface having a send and a receive ring connection. Setting up a call, exchange of information during the call and call clear-down are effected digitally via the exchange of ATM cells in whose header logic trunk identifiers (virtual path identifier VPI and virtual channel identifier VCI) are stored. At least one network interface includes a converter for at least partly and reversibly converting available data bytes in the header of the ATM cell into an identifier specific to the network. A header translation table in the converter is updated during the call set-up or call clear-down phase.

20 Claims, 3 Drawing Sheets

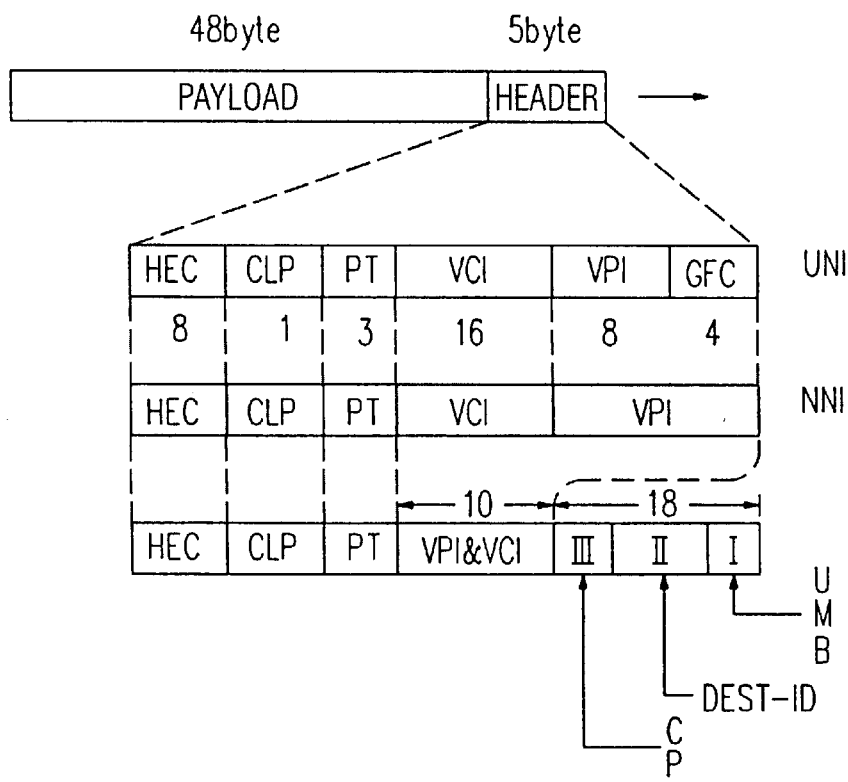
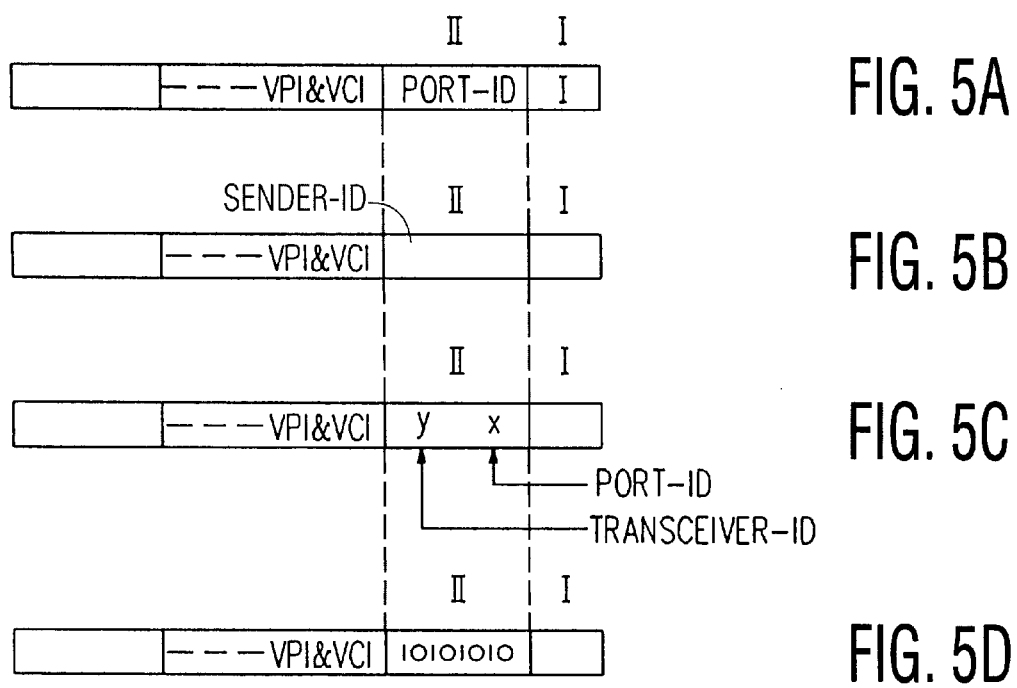

LOCAL AREA NETWORK WITH A HEADER CONVERTER

CROSS-REFERENCE TO RELATED APPLICATIONS

This application is related to a concurrently filed application by the inventors herein for A LOCAL AREA NETWORK WITH A PORT EXTENDER, Ser. No. 09/061, 815, now abandoned.

BACKGROUND OF THE INVENTION

The invention relates to a local area network operating in the asynchronous transfer mode (ATM), more particularly, a one-way or two-way ring network, comprising a plurality of stations and network interfaces (ATM transceivers) assigned to these stations and/or further networks comprising further stations, which network interfaces have each a send and a receive ring connection, the exchange of information being effected digitally via ATM cells in whose headers are stored address data, more particularly, trunk identifiers (VPI virtual path identifiers) and link identifiers (VCI virtual channel identifiers). In addition, the invention relates to an ATM cell suitable for use in such a network and a network interface for such a local area network and, finally, a stackable ATM unit comprising a plurality of network interfaces for constructing a switching point (switch).

In a local area network operating in the asynchronous transfer mode (ATM), fixed-length blocks are formed from the information to be transmitted (messages). An additional control indication bit completes each block form to a transmission unit called an ATM cell. An ATM cell is thus formed by a header and a payload which contains the information to be transmitted.

The ATM technique is used in different switching services such as data transmission services, speech transmission services, video services (for example, video conferences, video data bases), or when multimedia information in which speech, data and video information is combined is to be transmitted. An ATM network may then be a private network as well as a public network. A public ATM network is, for example, the B-ISDN network (broadband integrated services digital network). Private or public ATM networks may be connected based on the predefined ATM standard.

With ATM, cells are uninterruptedly transmitted on each transmission section. If no payload is to be sent at a certain time, specially marked idle cells are sent. In this manner, the ATM payload cells are transmitted independently of each other, because the distances in time on the line between neighboring payload cells are generally different. This type of transmission is therefore referenced asynchronous. Thus ATM represents an asynchronous transmission of payload cells of fixed length.

A distinction is made in payload cells between user cells containing, for example, messages or data of the user of a previously set-up connection in their information field, and signaling cells containing overhead bytes in their information field, for example, for the control unit of a network interface.

In ATM networks, the available transmission capacity (bandwidth) of a broadband channel is subdivided into so-called virtual paths. A virtual path represents in its turn a group of virtual channels. When a virtual channel is set up between a transmitter and a receiver, first the suitable virtual path is selected. Subsequently, a part of the bandwidth is occupied as a virtual channel of this path. For the identification of the virtual channel is used the identifier VCI (virtual channel identifier). For the identification of the paths is used the identifier VPI (virtual path identifier). This allows each transmitted cell to be allocated unambiguously because the combination VPI&VCI (virtual path and virtual channel identifiers) represents the logic identifier for the defined connection.

In addition, a distinction is made between a unicast connection set up between a single user of a first station and a user of a second station. When the connection is set up between a first user and a plurality of further users, the connection is referenced a multicast connection. When there are an arbitrary number of further users with such a multicast connection, this is called a broadcast connection.

From EP 0 614 296 A2 is known a local area ATM network of the type defined in the opening paragraph in which both user cells and signaling cells are processed as payload cells. Each network interface is then assigned a station. The user cells then contain the actual information, for example, messages or data of the user of this connection. When a virtual link is used, for example, for transmitting speech signals (telephone call), the information field of the user cell contains speech data. On the other hand, a signaling cell contains in its information field overhead bytes which are necessary for example, for coordination of the switching function in the ring, and more particularly, for setting up a connection or clearing the connection after the information has been transmitted. On the other hand, signaling cells are also used for transmitting overhead bytes between a station and the network. In such a case, the signaling cell has a standardized structure prescribed by UNI/NNI.

In such a known network, the connection is set up in the following manner: in the case of a connection request from a transmitter station to at least one receiver station, first a signaling cell is generated containing a query about the state of the receiver station. The at least one receiver station sends at least one signaling cell in response to the query which signalling cell contains the information about its status. Upon reception of the status information, the transmitter station forms at least one signaling cell for setting up the connection if the status of the at least one receiver station allows a connection. Subsequently, the connection is set up and the information is transmitted. The connection is cleared in reverse order.

From U.S. Pat. No. 5,600,795 is known a local area network operating in the asynchronous transfer mode (ATM), in which a connection is set up in similar manner in that first a control arrangement assigned to a transmitter station receives a signaling cell coming from the transmitter station which cell contains a realizable request for a unicast or multi-cast/broadcast connection of a user of the transmitter station. Subsequently, the signaling cell is sent to a user of at least one receiver station while the signaling cell contains in its payload at least one data about the user, the address of the transmitter station and a user-related identification for the return link. Upon reception of the signaling cell originating from the transmitter station, a control arrangement assigned to the receiver station generates a signaling cell to be sent to the transmitter station, which signaling cell contains in its payload at least an indication about the address of the assigned receiver station and a user-related identifier for the down link. Also in this network, each station has its own assigned network interface.

From "Telekommunikation aktuell, ATM Anwendungen, Multimediakommunikation über Datenautobahnen, VDE Verlag GmbH 1995", pp. 11–16 is known the basic structure of ATM cells according to the prescribed ATM standard. Hence, the ATM cell comprises a payload part having a length of 48 bytes and a header having a length of 5 bytes. The header is then structured differently depending on whether it is an ATM cell which is transmitted via an interface between a station and the network (UNI, user network interface) or between two different networks (NNI, network network interface).

When a UNI payload cell is concerned, the first 4 bits of the header form the GFC function (generic flow control). This makes it possible to avoid overload situations in the network due to a transgression of predefined bandwidths. Subsequently, a bit sequence of 8 bits VPI and 16 bits VCI follows for defining the virtual path and virtual channel, respectively. The next information of the header cell relates to the type of cell (PT, payload type) with which a distinction is made in this state of the art between user cells and signaling cells. Further information is given by the cell loss priority (CLP) and the header error control (HEC). The above structures PT, CLP, HEC are identical in UNI/NNI cells. In contrast, the NNI cell distinguishes itself from the UNI cell in that in lieu of the GFC structure occurring in the UNI cell, the structure for the path identifier (VPI) is extended from 8 to 12 bits.

SUMMARY OF THE INVENTION

It is an object of the invention to further develop a network or network interface respectively, of the type defined in the opening paragraph, and an ATM cell suitable for being processed in such a network, in that the communication in the ring is simplified without the standard determined outside the ring being violated.

This object is achieved with a network or network interface respectively, of the type defined in the opening paragraph, in that the at least one network interface is assigned converter means for at least partly and reversibly converting data bytes available in the header of the ATM cell into an identifier specific of a network.

In an ATM cell to be used in a network of the type defined in the opening paragraph, the solution according to the invention is that a multiplexer/demultiplexer arrangement is assigned to such an ATM cell which arrangement forms a port extender via which the data transfer takes place to a plurality of stations assigned to connection ports.

The invention versus the state of the art is characteristic in that the conversion of the data bytes available in the header bits of the ATM cell into the identifier specific of the network may provide a much more flexible data transfer in the network. The solution according to the invention is based on the approach that a standardization according to the UNI/NNI standard is to be maintained only where this is necessary on the basis of conditions with respect to the network environment.

As opposed to this, the prescribed standard need not be adhered to in the network, thus seen from the network on this side of the interfaces to the stations. A header format specific of the system had rather be used here. The two said formats are distinguished in the meaning of the header bits, but not in the length of the header. When entering the network, the header corresponding to the UNI/NNI standard is thus translated according to the invention into the header bits specific of the network. Conversely, when the cell leaves the network, its header is converted back into the UNI/NNI format. The selection of the header bits used for the identifier specific of the ring may then be free.

As a result of the fact that preferably the converter means include a header translation table updated during the call set-up or call cleardown phase, so that at least part of the header not occupied by the standardized VPI and VCI bit sequence has been overwritten with the network-specific identifier, there is a simple adaptation possibility. The header translation table is then defined during the signaling (call set-up) so that, on the one hand, the VPI and VCI bit sequence is maintained for the virtual channel identifier and that, on the other hand, the desired network-specific information is taken into account in the identifier. A first zone of the identifier may preferably be used for distinguishing unicast (single), multicast (plural) and broadcast (multiple) connections. A further zone called zone II in the following, of the network-specific identifier is used for indicating the destination of the ATM cell i.e. for determining the network interface to which the destination station is connected.

Finally, also indications about the priority and the property of a cell (control cell) may be stored in the network-specific header format.

In the unicast mode, the name of the network interface to which the desired destination station is connected is contained in the further zone of the network-specific identifier.

In contrast, in the multicast or broadcast mode, the information stored in the further zone of the network-specific identifier corresponds to the address of the sending network interface (Port-ID=SENDER ID). The ATM cell is thus transferred in the network from interface to interface until it finally arrives at its starting point, i.e. at the send network interface and is erased there. In the broadcast mode it is not necessary to make any further distinction, because the ATM cell is intended for each network interface. As opposed to this, there is to be determined beforehand in the multicast mode whether the ATM cell is meant for the respective network interface, as there is a station there belonging to the connection, or whether the cell is transferred to the output of the network interface without being switched to the station. For this purpose, a small broadcast/multicast table is used which is defined by the so-termed call handler during the signaling phase based on the stations desired for the connection. This small broadcast/multicast table on the station output is necessary, because the cells belonging to a certain broadcast/multicast connection use a global i.e. substantially identical VPI&VCI pattern. On the other hand, according to the UNI/NNI standard, different connection users also have different VPI&VCI values. The broadcast/multicast table therefore adapts the global VPI&VCI pattern of a connection in the ring network to user-specific VPI&VCI patterns according to the UNI/NNI standard. This adaptation takes place during the signaling phase. The effect of this broadcast/multicast table is that an erase notifier for erasing the cell from this table is read out for the case where in the multicast mode a cell is concerned that does not belong to the station belonging to the network interface.

A particular embodiment of the solution according to the invention comprises that at least one network interface includes a multiplexer/demultiplexer via which at least two stations are connected in common to the network interface. Accordingly, henceforth a plurality of stations corresponding to the multiplicity of the multiplexer or demultiplexer respectively, which stations may be operated from the same network interface, are assigned to each network interface. Thus the network interface has the feature of a so-called port extender which includes a fixed number of connection ports for the individual stations. The cells arriving at a comparably slower speed from the stations are transformed by the multiplex process to the high speed link to the send ring connections of the network interface. Conversely, the cells coming from the network interfaces and arriving at the different connection ports for the stations are distributed in the sense of a demultiplexing. This multiplex and demultiplex function of the port extender may be realized without the necessity of changing the above-mentioned basic structure of the network interface arrangement. Only measures need to be taken for putting complementary information in the further sub-structure of the network-specific identifier, on the basis of which complementary information the fact is taken into account that henceforth not only one but a plurality of stations are connected to each network interface via the port extender. When applying this solution and using of the port extender, it is particularly advantageous that the UNI/NNI standard is available at the input or output respectively, of the port extender, that is to say, is shifted thereto at the network interface.

For this purpose, in the case of the unicast mode there is provided that the further zone II of the network-specific identifier comprises two bit sections x, y, the one bit section x being used for identifying the respective access port connected to the multiplexer/demultiplexer and the other bit section y for identifying the network interface for which the ATM cell is intended. In contrast to the above-defined basic system without a port extender, henceforth the first bit section x is completed and the second bit section y is shortened. This refers to a further small broadcast/multicast table from which the call handler receives the information about which access ports are addressed to the respective network interface in what manner. When in the unicast mode the transmitter station selects a certain receiver station, the call handler is supplied with the coding information for the bit section x via the allocation known to it. The data bits are then stuffed so that in the x structure the information is stored for the respective access port and in the y structure the identification of the network interface including this access port.

In the case of a multicast/broadcast mode, the further zone (II) of the network-specific identifier has the indication about the sending network interface (SENDER-ID), as in the basic system without a port extender. Here too the ATM cell thus runs from interface to interface until it finally arrives back at its point of departure.

Also in the broadcast mode there is no substantial difference when the port extender is used.

In the multicast mode, however, there is provided that each network interface taking part in the connection has an allocation pattern defined during a call set-up, which pattern is used for selecting the access port taking part in the connection in this network interface, with which port the further zone II of the network-specific identifier is overwritten in the network interface. This measure takes account of the fact that in the multicast mode, on the one hand, the information is to be received whether the respective network interface actually has access ports serving the stations belonging to the connection and, if so, in addition, the further information which of the stations are involved in the connection. The first information is then known to the call handler via the system structure. The allocation pattern contained in the second information is determined during the signaling phase in accordance with the stations taking part in the connection and is then used at a later time as a distribution algorithm for the incoming cells in the output ports of the associated port extenders.

A particular way in which the solution according to the invention is used is that a network interface is set up which forms a local blocking-free N×N switching point when the data rate of the connection between port extender and transceiver exceeds the sum data rate of the individual port extender inputs or outputs, respectively.

These and other aspects of the invention will be apparent from and elucidated with reference to the embodiments described hereinafter.

BRIEF DESCRIPTION OF THE DRAWING

In the drawings:

FIG. 4 shows explanatory diagrams of the structure of ATM cells where FIG. 4a shows the total structure of a known ATM cell, FIG. 4b shows the ATM header structure according to the UNI standard, FIG. 4c shows the ATM header structure according to the NNI standard and FIG. 4d shows the basic structure of the ATM header according to an exemplary embodiment of the invention, FIG. 5 shows an explanatory diagram for the ATM cell transfer, that is to say, in FIG. 5a in the unicast mode of the network shown in FIG. 1 or 2, FIG. 5b in the multicast or broadcast mode of the network shown in FIG. 1 or 2, FIG. 5c in the unicast mode of the network shown in FIG. 3 and FIG. 5d in the multicast mode of the network shown in FIG. 3.

DESCRIPTION OF THE PREFERRED EMBODIMENTS

Figure 1:
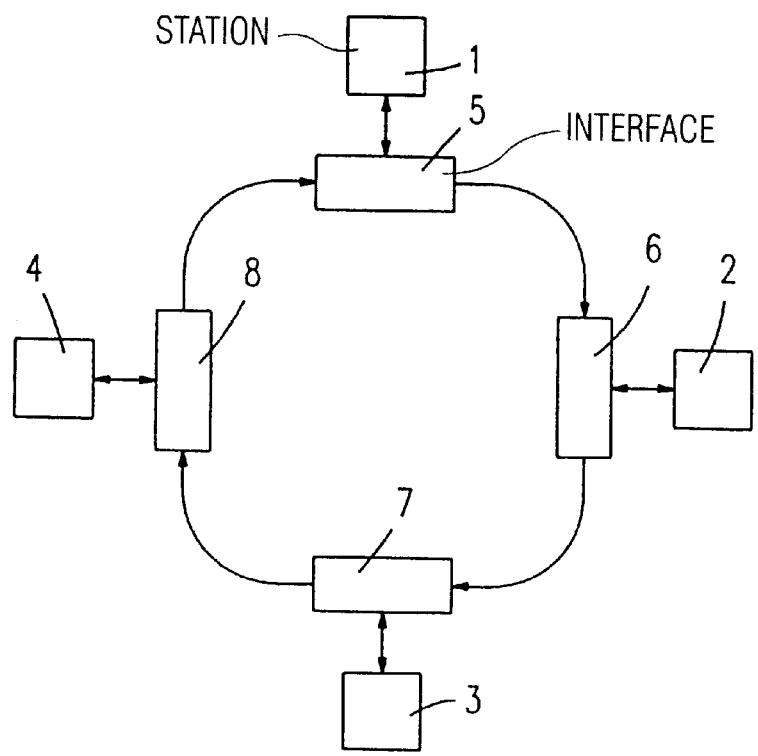
FIG. 1 shows a local area network operating in the asynchronous transfer mode (ATM) as is known in its basic structure from the state of the art.

The local area network operating in the asynchronous transfer mode ATM known from the state of the art with respect to its basic structure and shown in FIG. 1 comprises four stations 1–4 which are connected to a ring network via respective network interfaces 5–8. The data link between one of the stations 1–4 to a receiver station in the network is always established according to the ATM transfer method. For this purpose, each network interface 5–8 comprises send and receive ring connections which are used for transmitting cells. Each network interface 5–8 includes a switch (not further shown) which is coupled via buffer memories to the ring connections and the station and relays the cell stream. Details of the structure of such a network interface are described in the state of the art of EP 0 614 296 A2.

Figure 2:
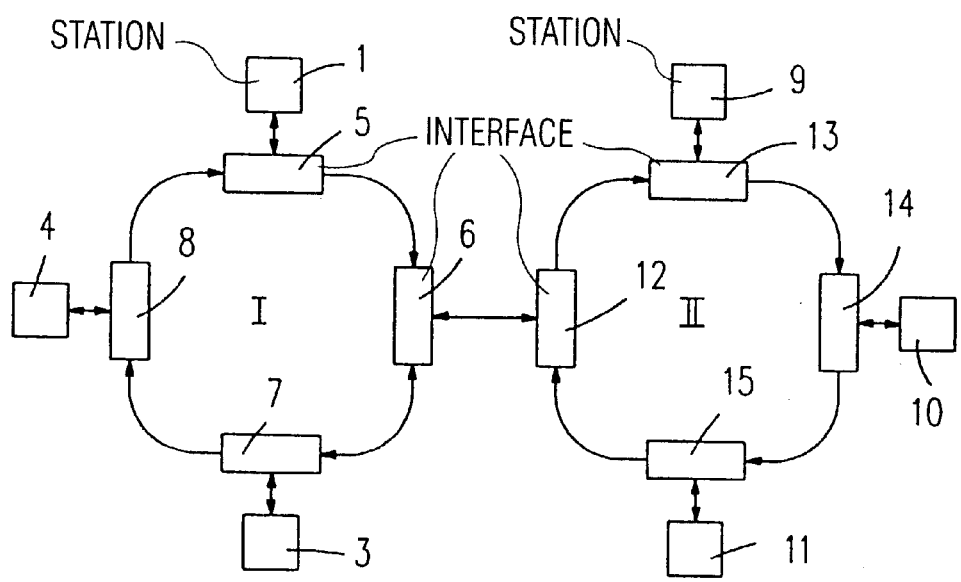
FIG. 2 shows another local area network operating in the asynchronous transfer mode ATM known in its basic structure according to the state of the art.

FIG. 2 shows a local area network arrangement comprising two local area ATM networks I and II. Each of the networks comprises a plurality of stations 1, 3, 4; 9, 10, 11 respectively, which are connected via separate network interfaces 5, 6, 7; 13, 14, 15 respectively, to the assigned network. The two networks are connected to each other via intercoupled network interfaces 6 and 12. With such coupled networks, the transmission of the ATM cells may be effected from a transmitter station in the range of the network I to a receiver station in the range of the network II (or the other way around).

Figure 3:
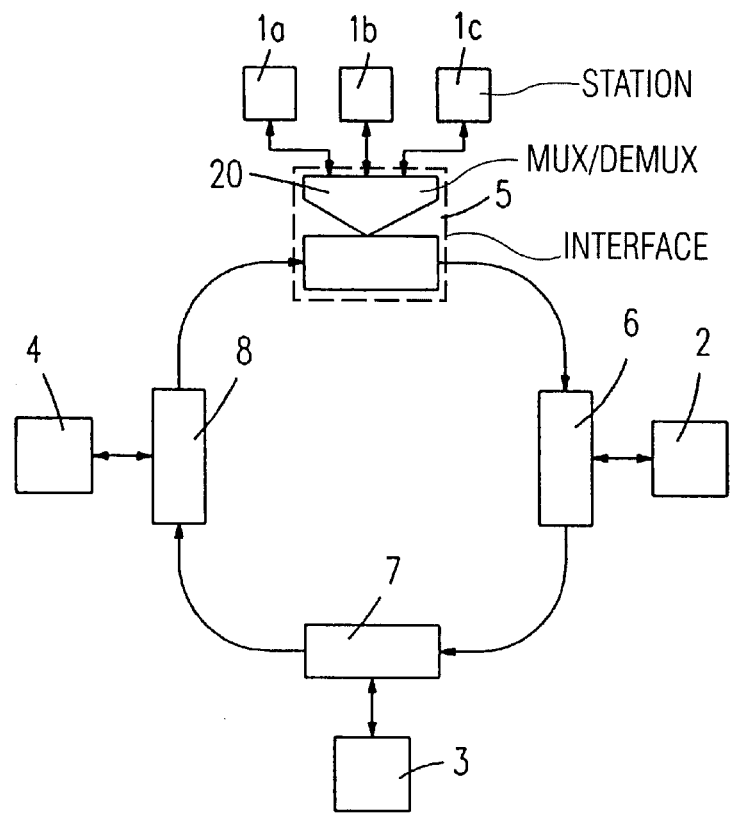
FIG. 3 shows a local area ATM network comprising a network interface which includes a port extender.

FIG. 3 shows the basic structure of a further local area ATM network. Differently from the networks shown in FIGS. 1 and 2, a plurality of stations 1a, 1b, 1c are connected to a network interface 5. For this purpose, the network interface 5 is extended by a multiplexer/demultiplexer 20 which makes it possible to couple the ATM cells from the station 1a, 1b, 1c connected to the network interface 5 to the ring connection of the network interface 5. Conversely, the ATM cells received from the network on the receive ring connection of the network interface 5 are again assigned to the desired stations 1a, 1b, 1c in a demultiplex function of the multiplexer/demultiplexer 20. In this manner, the network interface 5 is equipped with a so-called port extender to which a plurality of stations 1a, 1b, 1c corresponding to its number of ports can be connected. The port extender represented in FIG. 3 for the network interface 5 may also be realized for each of the other represented network interfaces in similar fashion. The multiplicity of each such port extender is not limited, in principle.

Figure 3A:
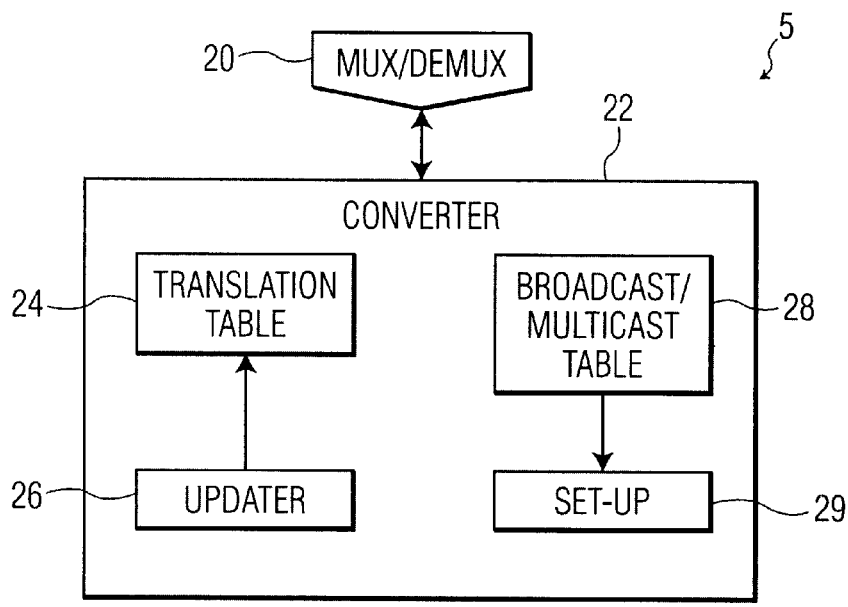
FIG. 3a shows a network interface having a converter including a translation table.

FIG. 3a shows one realization of a network interface 5 including a multiplexer/demultiplexer 20 and a header converter 22. The header converter 22 detects headers which are to be partially over-written, and includes a translation table 24 and an updater 26 which updates the table during call set-up and cleardown. For use in set-up of multicast and broadcast calls, the converter also includes a small broadcast/multicast table 28 and a circuit 29 for determining which of the network interfaces available in the network will take part in the call connection.

Starting from the basic structures of a local ATM network shown in FIGS. 1 to 3, the basic function of the solution according to the invention will be explained as follows.

FIG. 4a shows, basically, the structure of an ATM cell according to the standard, which cell comprises 53 bytes in all, of which 48 bytes are used for the transmission of the information (payload) and 5 bytes for controlling the transmission in the form of header data. These 5 bytes form a so-called header.

FIG. 4b shows the header structure according to standardization for a cell which is transmitted from a user to the network. This standard is referenced a UNI (user network interface). The first 4 bits are then formed by the GFC function (generic flow control) which 4 bits are used for avoiding overload situations in the network. The next 8 bits are used for defining the virtual path (VPI), whereas the subsequent consecutive 16 bits are used for defining the virtual channel (VCI). Further bits in the header are provided for featuring the type of cell PT (payload type), the cell loss priority (CLP) and the header error control (HEC).

FIG. 4c shows, in contrast, the structure of the header for the case where the ATM cell is to be transmitted via a network network interface (NNI) from one local area ATM network to another network (compare, for example, FIG. 2). For the NNI standard, the first 4 bits which are reserved in the UNI cell for the GFC function are added to the VPI structure, so that the whole structure available for VPI&VCI has a length of, for example, 28 bits.

In FIG. 4d is now shown the basic structure of an ATM cell, how it is received after the conversion from the UNI/NNI standard to the network-specific standard. First there may be assumed that the structures PT, CLP and HEC of the header remain unchanged compared to the standardized format.

In the header structure reserved for VPI&VCI, which header structure comprises, for example, 28 bits, there is an idle structure of, for example, 16 bits when used in a standard manner, because 10 bits are sufficient for the VPI&VCI payload when 1024 connections are set up. The remaining bit structure is set to zero according to the UNI/NNI standard.

According to the invention, this bit structure (compare FIG. 4d) is used for the network-specific (ring-internal) identifier, i.e. the idle bits are overwritten.

The identifier then comprises a first section I (UMB) in which the information is stored whether a unicast, a multicast or a broadcast link is concerned. The further zone II (DEST-ID) contains, in essence, the address information for the ATM cell. This will be described in further detail hereafter. Finally, another zone III (CP) is reserved for priority indications or for the type of cell, respectively.

The modified header according to FIG. 4d thus includes the respective VPI&VCI structures and also the original structure. The remaining bit sequence structure not used according to the standard may, however, be programmed optionally. The conversion of the header from UNI/NNI format to the ring-specific header structure takes place when the cell enters the network interface. The following steps are then carried out:

1. The VPI&VCI bits according to the UNI/NNI standard and available in the header are detected and thus a small broadcast/multicast table stored in the network interface is addressed. In this table, the allocation is stored between the channel identifier VPI&VCI and a desired destination address in the network. The definition of this table is made during the signaling phase, that is to say, when a call is being set up.
2. The new (ring-specific) header format is read from the small broadcast/multicast table and the incoming header is overwritten with this format.
3. Based on the information stored in the overwritten header, a decision is made whether the ATM cell is received from the local processor of the network interface (when it is a signaling cell intended for this purpose), or whether the cell is to return to the station or is to enter the ring of the network.

As described above, the first zone I of the network-specific header format characterizes the property of the cell whether it is a unicast, multicast or broadcast connection cell. Depending on the type of connection and further depending on whether a network interface includes or not a port extender as shown in FIG. 3, the cell structure used in the further zone II differs as follows:

First the case where it is a unicast connection and each network interface shown in FIGS. 1 and 2 is assigned exactly one station is considered with reference to FIG. 5a. In this case, the address of the network interface to which the desired destination station is connected (Port-ID) is located in zone II.

FIG. 5b shows the cell structure in the zone II when, different from FIG. 5a, a multicast or broadcast operation is concerned. In that case, zone II contains the address of the network interface from where the ATM cell was sent (SENDER-ID). This leads to the fact that the ATM cell runs from the sending station through the whole network until it finally comes back to the sending station.

FIG. 5c shows the structure of the further zone II of the network-specific identifier when in the case of the unicast operation a network interface shown in FIG. 3 includes a port extender. For this case, a subdivision is made into a first bit sequence x and a second bit sequence y. In the first bit sequence x is included the identifier for the access port to which the desired destination station is connected. On the other hand, the second bit sequence y shows the identifier of the network interface where the access port of the destination station is.

FIG. 5d shows the cell structure in the case of a multicast operation for a network interface shown in FIG. 3 having a port extender. The bit sequence shown in zone II takes into account which access ports in an addressed network interface are desired for the connection, for example, here the access ports 0, 2, 4, 6, whereas the remaining access ports 1, 3, 5, 7 do not take part in the multicast connection.

For the case where a broadcast operation is to take place while a port extender is used, there is basically no difference compared with the structure shown in FIG. 5b where a port extender is not used. Just like FIG. 5b, the SENDER-ID is used as a destination address of the ATM cell, because all the stations connected to the network are involved in the connection.

The detailed mode of operation in accordance with the solution according to the invention will be explained in the following: the following cases are then distinguished:

1. Unicast Mode Without a Port Extender

For the definition of the small broadcast/multicast table in the network interface, the call handler knows during the signaling phase at which network interface the station with which the connection is to be realized is located. When the header bits in the ATM cell are converted when the transition to the network interface takes place, the address (Port-ID) of the respective network interface to which the station is connected is thus written in the idle bits in zone II. When a signaling cell is concerned, the respective destination for this signaling cell is written in the idle bit area. This may also relate, for example, to a signaling cell for the CPU in the same network interface.

The ATM cell overwritten with the ring-specific address information now enters the ring network.

When the destination address of the network interface reached next does not correspond with the Port-ID entered, the ATM cell is conveyed to the ring output (in the case of a two-way ring network to both outputs). When the network interface corresponding with the Port-ID is concerned, the cell is conveyed to the station output. At that point, the header bits are converted back to the standardized format in which the bits found in the unused VPI&VCI structure are set to zero.

A corresponding mode of operation is found when the cells run in reverse direction.

2. Multicast Mode Without a Port Extender

During the signaling phase, the call handler determines to which network interfaces transmissions are to take place i.e. which stations are involved in the connection. This is taken into account in the small broadcast/multicast table by means of which the standardized UNI/NNI format is converted to the network-specific header bit structure.

Based on the multicast information stored in the zone I of the network-specific identifier, the address of the sender is stored in the zone II as an address code for the ATM cell.

During the exchange of information, the ATM cells having the ring-specific header format travel through the ring network and in each network interface the cell is copied and transferred to the ring output until the cell finally reaches the send network interface and is erased there.

A test is made in each network interface whether the cell is intended for this network interface. If not, the copied cell is erased. When the cell is indeed intended for the network interface, the copied cell is transferred to the station through the output of the network interface.

The test whether the respective cell belongs to the network interface or not is made with the aid of the small broadcast/multicast table stored beforehand during the signaling phase.

3. Broadcast Mode Without a Port Extender

During the signaling phase there is established that cells are to be transmitted to all the network interfaces located in the network, because each connected station takes part in the connection. As discussed re 2., the Port-ID of the transmitter is stored here too as an address code in the zone II of the network-specific identifier, so that here too the ATM cell travels through the whole network until it finally reaches the sender again and is erased there.

4. Unicast Mode With the Use of the Port Extender

Further to the way of processing described re 1., the call handler is first informed of how the individual stations connected to the access ports of the port extender are assigned to the respective network interfaces. This refers to the system-specific structuring which is announced to the call handler, for example, in the form of a database.

Knowing this, the call handler determines during the signaling phase over which network interface the connection to the desired destination station is to take place. In the zone II of the network-specific identifier, not only data bits occur in area y for featuring the network interface, but also data bits in the section x which contain a code indicating which one of the access ports connected to the network interface belongs to the desired station.

For the rest, the cell transfer is effected as described re 1. Also the reconversion of the network-specific header format to the standardized format is effected by resetting the bits in the section x or y to zero.

5. Multicast Mode With the Use of a Port Extender

With this mode of operation, a definition of which stations are involved in the connection is again given during the signaling phase. The call handler now knows to which network interfaces the access ports for the stations to be included in the connection belong. In consequence, a bit pattern is stored in each network interface during the signaling phase, which bit pattern is characteristic of which one of the access ports of the port extender is to obtain ATM cells. Each network interface thus receives different bit samples depending on the access port to be activated.

During the signaling phase there is also determined which network interfaces are involved at all in the connection, that is to say, the network interfaces are determined to which at least one access port for a station is to be activated. Again a small broadcast/multicast table is defined for this purpose.

In the zone II of the network-specific identifier, again the address of the sender is indicated as Port-ID as an address as described re 2. and 3.

The transmission of the cells now takes place as follows:

Each cell is taken from the sender access port to the high-speed line leading to the network interface and enters the network from there. If the cell has entered the next network interface, the further processing depends on whether at least one of the access ports of this network interface is involved in the connection.

If this is not the case, the cell is conveyed to the ring output and enters the next network interface. If, based on the small broadcast/multicast table, there may be established that the cell is intended for at least one of the access ports of the network interface, the bit pattern stored in this network interface is used for processing the cell. All the x+y bits of the data bit sequence occurring in zone II are used, so that a corresponding multiplicity of the port extender is taken into account. Based on the bit patterns, the individual cells of the access port are demultiplexed so that they reach the desired stations included in the connection.

The described way of processing now takes place the same in each of the network interfaces reached by the ATM cell until the cell again reaches the send interface and is erased there.

6. Broadcast Mode With the Use of a Port Extender

Compared to the operation described re 5., no specific bit pattern need be indicated in the broadcast mode because communication is to take place with each connected sender. Therefore, also when a port extender is used, the mode of operation as described re 3 is implemented.

What is claimed is:

1. A local area network operating in asynchronous transfer mode (ATM), comprising:

a plurality of stations; and network interfaces assigned to these stations, each of said network interfaces having a send and a receive connection, call set up, exchange of information during call set-up, and call clear-down being digitally effected via exchange of ATM cells in whose headers logic link identifiers are stored, said logic link identifiers including virtual path identifiers (VPI) and virtual channel identifiers (VCI) having a standardized bit sequence, wherein at least one of said network interfaces comprises converter means for at least partly and reversibly converting data bytes available in a header of an ATM cell received from outside the local area network into an intra-network identifier.

2. A network as claimed in claim 1, wherein the at least one network interface includes a multiplexer/demultiplexer for connecting at least two stations in common to the network interface.

3. A network as claimed in claim 1, wherein a plurality of said network interfaces are coupled to each other to form a switch.

4. A network operating as claimed in claim 1, wherein the converter means comprise:

a header translation table; and means for updating the table during a call set-up or call clear-down phase such that at least part of the header occupied by the standardized VPI and VCI bit sequence is overwritten with the intra-network identifier.

5. A network as claimed in claim 4, wherein the intra-network identifier has a first zone (I) which includes an identifier for distinguishing unicast/multicast and broadcast cells.

6. A network as claimed in claim 5, wherein the intra-network identifier in multicast or broadcast mode corresponds to an indication of a network interface at which conversion to the intra-network format has taken place.

7. A network as claimed in claim 6, wherein the converter means comprises:

a small broadcast/multicast table; and means, responsive to said small broadcast/multicast table and operable during setup of a call, for determining which of the network interfaces available in the network take part in a respective connection.

8. A network as claimed in claimed in claim 5, wherein a further zone (ID) of the intra-network identifier corresponds to a destination interface for the respective ATM cell.

9. A network as claimed in claim 8, wherein another zone (III) of the intra-network identifier contains at least one bit signifying a signaling cell and/or priority cell.

10. A network as claimed in claim 8, wherein, in unicast mode, the further zone (II) of the intra-network identifier corresponds to an indication of a network interface to which a desired destination station is connected.

11. A network as claimed in claim 8, wherein the at least one network interface includes a multiplexer/demultiplexer for connecting at least two stations in common to the network interface, and in unicast mode, the further zone (II) of the intra-network identifier comprises two bit sections (x, y), one bit section (x) being used for identifying respective access ports connected to the multiplexer/demultiplexer and the other bit section (y) being used for identifying a network interface which an ATM cell has as a destination.

12. A network as claimed in claim 8, wherein the at least one network interface includes a multiplexer/demultiplexer for connecting at least two stations in common to the network interface, and in multicast or broadcast operation, the further zone (II) of the intra-network identifier contains an indication of a sending network.

13. A network as claimed in claim 12, wherein, in multicast operation, each network interface taking part in a connection, has an allocation pattern defined during set up of a call for selecting, in that network interface, access ports taking part in the connection, with which allocation pattern the further zone (II) of the intra-network identifier is overwritten in the network interface.

14. A network interface for a local area network operating in asynchronous transfer mode (ATM), for connecting at least one station, the network interface having a send and a received connection and data transfer taking place in digital form via exchange of ATM cells whose headers carry logic link identifiers, wherein the network interface comprises:

converter means for at least partly and reversibly converting available data bytes in a header of an ATM cell received from outside the local area network into an intra-network identifier.

15. An interface as claimed in claim 14, further comprising a multiplexer/demultiplexer arrangement forming a port extender for effecting data transfer to a plurality of stations assigned to access ports.

16. A method of transmitting data via an ATM cell over a network, wherein said ATM cell has a header in which a predefined number of data bytes for logic trunk identifiers are contains, and has a payload in which a further predefined umber of data bytes for a transmitted payload are contained, wherein included in the header of the ATM cell, received from outside the local area network, arc available data bits not used for standardization of a trunk identifier, the method comprising:

using at least part of said available data bits for an intra-network identifier in the network; and in a network interface, at least partly and reversibly converting data bytes in said header into said intra-network identifier.

17. A method as claimed in claim 16, wherein the intra-network identifier comprises a first zone (I) which is determined by a transmission mode and a further zone (II) which describes a destination of the cell.

18. A method as claimed in claim 17, wherein, in a unicast mode, the further zone (II) contains an address of a network interface corresponding to the destination.

19. A method as claimed in claim 17, wherein, in the unicast mode in which a network interface is assigned a plurality of stations, the further zone (II) contains an additional identifier (y) for allocating ATM cells to a selected access port in the network interface.

20. A method as claimed in claim 17, wherein, in the multicast/broadcast mode, the further zone (II) contains an address of a network interface that corresponds to a sending station.

* * * * *